United States Patent
Maruta (10) Patent No.: US 7,129,996 B2
(45) Date of Patent: Oct. 31, 2006

(54) LIQUID CRYSTAL TELEVISION

(75) Inventor: Naoto Maruta, Daito (JP)

(73) Assignee: Funai Electric Co., Ltd., Daito (JP)

( * ) Notice: Subject to any disclaimer, the term of this patent is extended or adjusted under 35 U.S.C. 154(b) by 440 days.

(21) Appl. No.: 10/808,603

(22) Filed: Mar. 25, 2004

(65) Prior Publication Data

US 2004/0246385 A1    Dec. 9, 2004

(30) Foreign Application Priority Data

Mar. 27, 2003   (JP)   ............ 2003-001633 U (51) Int. Cl.
*H04N 5/64*   (2006.01)
(52) U.S. Cl. .................................. 348/794
(58) Field of Classification Search ............. 348/790, 348/791, 794, 836, 843; 248/276.1, 278.1; 361/681
See application file for complete search history.

(56) References Cited

U.S. PATENT DOCUMENTS

| | | | | |
|---|---|---|---|---|
| 5,436,792 A | * | 7/1995 | Leman et al. ............ | 361/686 |
| 6,378,830 B1 | * | 4/2002 | Lu ........................... | 248/278.1 |
| 6,570,627 B1 | * | 5/2003 | Chang ...................... | 348/794 |
| 7,023,499 B1 | * | 4/2006 | Williams et al. .......... | 348/836 |
| 2004/0041851 A1 | * | 3/2004 | Lu ........................... | 345/905 |
| 2004/0084578 A1 | * | 5/2004 | Cho et al. ................. | 248/125.1 |
| 2006/0032998 A1 | * | 2/2006 | Depay ...................... | 248/291.1 |
| 2006/0033847 A1 | * | 2/2006 | Kim .......................... | 348/836 |

FOREIGN PATENT DOCUMENTS

| | | |
|---|---|---|
| JP | 3032979 | 10/1998 |
| JP | 2000-105538 | 4/2000 |
| JP | 2000-333100 | 11/2000 |
| JP | 2002-032028 | 1/2002 |

* cited by examiner

*Primary Examiner*—Paulos M. Natnael
(74) *Attorney, Agent, or Firm*—Crowell & Moring LLP (57) ABSTRACT

There is a problem that a liquid crystal television having a stand tilting at a plurality of tilt angles needs a complicated structure. For solving the problem, while a pivot member 22 pivotable to the main body 10 is kept to be at an angle of 35 degree to the main body 10, a moving block 25 slides toward the pivot member 22, so that an arm 21 extends and shortens to change a tilt angle of the main body. Therefore, the main body 10 can tilt at a plurality of angles. On the other hand, the stand 20 is structured not to be complicated, and thus can be contained compact.

9 Claims, 7 Drawing Sheets

LIQUID CRYSTAL TELEVISION

BACKGROUND OF THE INVENTION

1. Field of the Invention

The present invention relates to a crystal liquid television, particularly, to a crystal liquid television in which a main body and a supporting arm provided to a back of the main body are at a predetermined angle and a bottom portion of the main body and a lower end portion of the supporting arm are grounded to support the tilting main body.

2. Description of the Related Art

Conventional liquid crystal televisions are such that a supporting arm is pivotally mounted to a main body, a base portion having a plurality of slits is provided to a portion where the supporting arm is grounded, and an end portion of the supporting arm is inserted into one of the slits.

According to such a structure, by inserting the end portion of the supporting arm into the slit so that the main body is at a required angle, a tilt angle of the main body can be adjusted to the required angle and thereby the main body is fixed.

SUMMARY OF THE INVENTION

In the conventional liquid crystal televisions, there are the following problems. A complicated structure is required to provide the base portion having a plurality of the slits. Additionally, because an area of the base portion needs to be large, a wider placement space needs to be secured. For solving these problems, an object of the present invention is to provide a liquid crystal stand having a simply-structured, compact stand.

To achieve the object, a liquid crystal television according to a first aspect of the present invention includes a main body having a substantially thin box shape and a stand placed to a back surface of the main body. The stand splits from the back surface of the main body, and supports the standing main body tilting backward at a predetermined angle. The stand includes: a substantially box shaped pivot member connected by a predetermined pivot axis between its retracted state substantially in parallel with the main body and its split state at the predetermined angle to the main body; a moving block held in the pivot member and movable in a direction of a radius about the predetermined pivot axis; a stopper for ratching the main body when the stand is at a predetermined angle to the main body to thereby prevent the stand from splitting over the predetermined angle; concave and convex engagement structures formed in parallel with a moving direction of the moving block to slidably engage each other, the structures being respectively formed to the moving block and the pivot member; and a supporting arm whose top ends are fixed to the moving block, which projects outward from the pivot member, and which has a grounding portion formed at its lower end by bending a rod into a handle shape to reach an outer ground plane.

A guide block in parallel with the moving direction of the moving block and substantially in slidable contact with the moving block is formed in the pivot member. A gap is formed to a substantial center of the guide block. A bended portion of a blade spring bended to a substantially dogleg shape projects via the gap toward the moving block. Both end portions of the blade spring come into contact with an inner circumferential wall in the pivot member to generate resilience so that the bended portion projects toward the moving block. The resilience is enhanced by inserting a resilient member into a small space surrounded by the bended portion of the blade spring and the inner circumferential wall in the pivot member. When the moving block is at an upper end position to which it is movable in the pivot member, the bended portion comes into contact with a lower curvedly-chamfered corner of the moving block, and when the moving block is at a lower end position to which it is movable in the pivot member, the bended portion comes into contact with an upper curvedly-chamfered corner of the moving block, so that the bended portion of the blade spring follows the chamfered portions and simultaneously the bended portion deforms to project toward the moving block to thereby release the resilience. The main body has a larger grounding area in tilting with the moving block being at the upper end position in the pivot member than in tilting with the moving block being at the lower end position in the pivot member. A rubber leg is installed to a bottom surface of the main body.

According to this aspect of the present invention, the pivot member is pivotally installed to the main body, so that the moving block held in the pivot member and the supporting arm projecting outward from the moving block can relatively pivot with respect to the main body. Additionally, the lower end of the supporting arm can reach an outer ground surface, so that the lowermost portion of the main body and the grounding portion provided to the top end of the stand can be grounded while changing a split angle between the main body and stand. Therefore, by changing a pivot angle of the pivot member, the main body can be supported while changing its tilt angle.

The pivot member ratches the main body to prevent the stand from splitting over a predetermined angle, so that the tilt angle of the main body is limited to an angle at which the monitor is easy to view and the main body can be supported stably.

The moving block, which is held in the pivot member, can slide in a direction of a radius about the pivot axis of the pivot member, so that the supporting arm projecting from the moving block can slide in the direction of the radius about the pivot axis of the pivot member. In other words, by sliding the supporting arm toward the pivot member, the ground position of the stand relatively changes, so that the tilt angle of the main body can be changed. For example, by sliding the supporting arm away from the pivot axis with keeping a pivot angle of the pivot member constant, the main body rises. By sliding the supporting arm toward the pivot axis with keeping the pivot angle of the pivot member constant, the main body is tilted.

The concave and convex engagement structures formed in parallel with a moving direction of the moving block to slidably engage each other are respectively formed to the moving block and the pivot member, so that walls of the concave and convex are in slidable contact with each other to guide the moving block. As a result, the clatter is avoided and the track becomes stable.

Next, the guide block in parallel with the sliding direction of the moving block provided in the pivot member is in slidable contact with the moving block. Additionally, the bended portion of the blade spring bended into a substantially doglegged shape via the gap formed to the substantial center of the guide block projects toward the moving block, and both end portions of the blade spring is held in contact with the inner circumferential wall, so that the blade spring provides the resilience to project the bended portion of the blade spring toward the moving block. In other words, the blade spring presses the moving block in a direction vertical to the sliding direction of the moving block by use of the constant resilience, the moving block does not slide toward the pivot member unless an external force is applied to the moving block to resist the resilience of the blade spring. Therefore, the moving block does not slide unexpectedly.

Further, the resilience of the bended portion of the blade spring is enhanced by the resilient member inserted into the small space surrounded by the inner circumferential wall in the pivot member and the bended portion, so that the position of the moving block can be stably held in the pivot member. Additionally, fatigue of the blade spring is reduced by assisting the resilience of the blade spring by use of the resilient member. Therefore, the durability can be enhanced.

On the other hand, by curvedly chamfering the upper and lower corners of the moving block, the bended portion of the blade spring follows the chamfered portions when the bended portion of the blade spring comes into contact with the corners. In other words, the blade spring releases the resilience while the bended portion of the blade spring is following the chamfered shapes of the corners. Therefore, to slide the moving block from a position at which the bended portion of the blade spring is in contact with both corners to another position, the external force equal to or over the released resilience is required. Additionally, both corners and the bended portion of the blade spring come into contact with each other at a predetermined gradient to the sliding direction, so that the resistance when the moving block slides is increased. Therefore, the moving block can be stably held at the positions at which the bended portion of the blade spring comes into contact with both corners.

The position at which the bended portion of the blade spring comes into contact with the upper corner of the moving block is the lower end position to which the moving block can slide, and the position at which the bended portion of the blade spring comes into contact with the lower corner of the moving block is the upper end position to which the moving block can slide, so that the moving block can be stably held at both end position to which the moving block can slide.

Further, the lower end of the arm is formed by bending a rod to a wide handle shape, so that an external force for sliding the moving block can be easily applied to the moving block by gripping the grounding portion by use of a hand. Additionally, the grounding portion becomes wide to increase the stability.

On the other hand, by installing a rubber foot to the bottom surface of the main body, the grounding portion can be hard to slip. Additionally, the shock when the liquid crystal television is grounded can be eased by means of the resilient deformation of the rubber member. Further, the grounding area of the rubber foot becomes larger when the moving block is at the upper end position to which it can move than when the moving block is at the lower end position to which it can move, so that the main body is hard to slip forward even when the main body tilts backward.

A liquid crystal television according to a second aspect of the present invention includes: a main body having a substantially thin box shape; and a stand placed to a back surface of the main body. The stand splits toward the back of the main body to support the main body tilting backward at a predetermined angle. The stand includes: a substantially box shaped pivot member pivotally connected by a predetermined pivot axis between a retracted state in parallel with the main body and a split state at a predetermined angle to the main body; a moving block which is held in the pivot member and is movable within a predetermined length in the radial direction about the pivot axis; and supporting arm whose upper end is fixed by the moving block and which projects outward from the pivot member to reach an outer grounding portion at its lower end.

In this liquid crystal television, the substantially box shaped pivot member is pivotally installed to the main body, so that the moving block held in the pivot member and the supporting arm projecting outward from the moving block can pivot relatively to the main body. The bottom end of the supporting arm can reach the outer ground surface, so that the most lower portion of the main body and the grounding portion provided to a distal end of the stand can be grounded while changing a split angle between the main body and the stand. Therefore, by changing a pivot angle of the pivot member, the main body can be supported while changing a tilt angle of the main body.

Additionally, the moving block is held in the pivot member and can slide in a direction of a radius about the pivot axis of the pivot member, so that the supporting arm projecting from the moving block can slide in the direction of a radius about the pivot axis of the pivot member. In other words, by sliding the supporting arm toward the pivot member, a ground position of the stand relatively changes, so that the tilt angle of the main body can be changed. For example, by sliding the supporting arm away from the pivot axis with keeping a pivot angle of the pivot member constant, the main body is raised. By sliding the supporting arm toward the pivot axis with keeping a pivot angle of the pivot member constant, the main body tilts. Further, the moving block is stably held at a plurality of positions, so that the main body can be stably supported at plurality of tilt angles.

A liquid crystal television according to a third aspect of the present invention includes a stopper which is formed to the pivot member and which ratches the main body when the stand splits to be angled at a predetermined degree to the main body to thereby prevent the stand from splitting over the predetermined degree.

In this aspect of the present invention, the pivot member ratches the main body to prevent the stand from splitting over the predetermined degree, so that a tilt angle of the main body can be limited to angles at which the monitor is easy to view and at which the main body can be stably supported.

According to a fourth aspect of the present invention, concave and convex engagement structures formed in parallel with a moving direction of the moving block to slidably engage each other are respectively formed to the moving block and the pivot member.

In this aspect of the present invention, the concave and convex engagement structures formed in parallel with a moving direction of the moving block to slidably engage each other are respectively formed to the moving block and the pivot member, so that walls of the engagement structure are in slidable contact with each other to guide sliding of the moving block. As a result, the clatter is avoided and the track becomes stable.

According to a fifth aspect of the present invention, the guide block in parallel with the sliding direction of the moving block provided in the pivot member is in substantially slidable contact with the moving block. The substantially doglegged bended portion of the blade spring projects via the gap formed to the substantial center of the guide block toward the moving block, and both end portions are held in contact with the inner circumferential wall in the pivot member, so that the blade spring provides the resilience to project the bended portion of the blade spring toward the moving block. In other words, the blade spring presses the moving block in a direction vertical to the moving direction of the moving block by use of the constant resilience, so that the moving block does not slide toward the pivot member unless the external force which resists the resilience of the blade spring is applied to the moving block.

The lower end of the arm is formed by bending the rod to the wide handle shape, so that the external force for moving the moving block is easily applied to the moving block by gripping the lower end by use of a hand. Additionally, the grounding portion becomes wide to enhance the stability.

According to a sixth aspect of the present invention, the resilient member which enhances the resilience of the bended portion of the blade spring is inserted into the small space surrounded by the bended portion and the inner circumferential wall in the pivot member. In this aspect of the present invention, the resilient member is inserted into the small space surrounded by the bended portion and the inner circumferential wall in the pivot member to enhance the resilience of the bended portion of the blade spring, so that the position of the moving block can be stably held in the pivot member. Additionally, the rubber block assists the resilience of the blade spring to reduce the fatigue of the blade spring. Therefore, the durability can be enhanced.

According to a seventh aspect of the present invention, the bended portion is in contact with the lower corner of the moving block when the moving block is at the upper end position to which the moving block can move in the pivot member, and the bended portion is in contact with the upper corner of the moving block when the moving block is at the lower end position to which the moving block can move in the pivot member. Additionally, the curved chamfers are formed to the corners. The blade spring is such that its bended portion follows the chamfered portions and is deformed to project toward the moving block to thereby release the resilience.

In this aspect of the present invention, the curved chamfers are formed to the upper and lower corners of the moving block, so that the bended portion of the blade spring comes into contact with both corners to follow the chamfers. In other words, the bended portion of the blade spring follows the shapes of the chamfered corners, so that the blade spring releases the resilience. Therefore, to move the moving block from the position at which the bended portion of the blade spring is in contact with both corners to another position, the external force equal to or over the released resilience is required. Additionally, both corners and the bended portion of the blade spring come into contact with each other at a predetermined gradient to the moving direction of the moving block, so that the resistance when the moving block slides becomes great. Therefore, the moving block can be stably held at the positions at which the bended portion of the blade spring is in contact with both corners. As a result, the moving block can be stably held.

The position at which the bended portion of the blade spring comes into contact with the upper corner of the moving block is the lower end position to which the moving block can move in the pivot member, and the position at which the bended portion of the blade spring comes into contact with the lower corner of the moving block is the upper end position to which the moving block can move in the pivot member, so that the moving block can be stably held at both end positions to which the moving block can move.

According to an eighth aspect of the invention, the lower end of the supporting arm is formed by bending a rod to a wide handle shape.

In this aspect of the present invention, the grounding portion is formed by bending the rod to the wide handle shape, so that an external force for sliding the moving block can be easily applied to the moving block by gripping the grounding portion by use of a hand. Additionally, the grounding portion becomes wide to enhance the stability.

According to a ninth aspect of the invention, a rubber foot is installed to the bottom surface of the main body. Additionally, the grounding area becomes larger in a tilted state of the main body at the most upper position of the moving block in the pivot member than in a tilted state of the main body at the most lower position of the moving block in the pivot member.

In this aspect of the present invention, the rubber foot is grounded more largely when the moving block is at the upper end position to which the moving block can move than when the moving block is at the lower end position to which the moving block can move. As a result, the main body is hard to slip forward even when the main body tilts backward.

As described above, according to the first and second aspects of the present invention, by providing the pivotable, extendable stand, a tilt angle of the main body can be adjusted widely, and the liquid crystal television having the simply structured stand can be provided.

According to the third aspect of the present invention, the main body can be held at an angle at which a monitor is easy to view.

According to the forth aspect of the present invention, the stand can extend and shorten stably.

According to the fifth aspect of the present invention, the stand can be prevented from extending and shortening unexpectedly.

According to the sixth aspect of the present invention, the high durability liquid crystal television can be provided.

According to the seventh aspect of the present invention, the most extended/shortened states of the stand can be stably held.

According to the eighth aspect of the present invention, it becomes easy to extend/shorten the stand.

According to the ninth aspect of the present invention, the main body becomes hard to slip.

DETAILED DESCRIPTION OF THE PREFERRED EMBODIMENTS

Embodiments of the present invention are explained below in the following order:

(1) Movement of stand (2) Structure of stand (3) Slide movement.

(1) Structure of liquid crystal television

Figure 1:
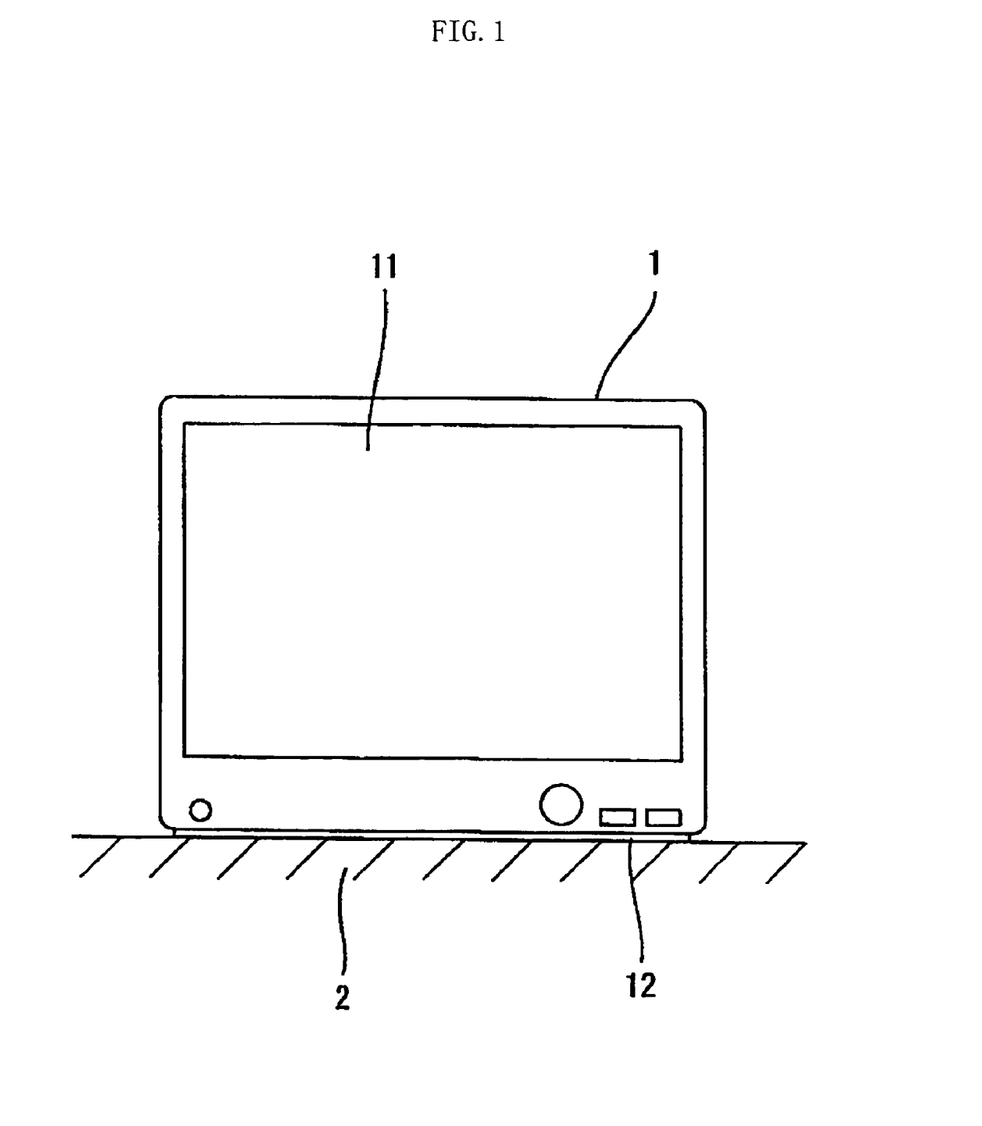
FIG. 1 is a front view of a liquid crystal television of the present invention.

FIG. 1 is a front view of a liquid crystal television of an embodiment of the present invention. In FIG. 1, a crystal liquid television is placed on a mount rack having a substantially planar top surface. A crystal liquid monitor 11 is provided to a forward surface of a main body 10 having a substantially thin box shape. A rubber member 12 having a high friction coefficient is mounted to a bottom surface of the main body 10. An axial direction of the rubber member 12 and a width direction of the main body 10 coincide with one another. The main body 10 is grounded on the mount rack 2 via the rubber member 12.

Figure 2:
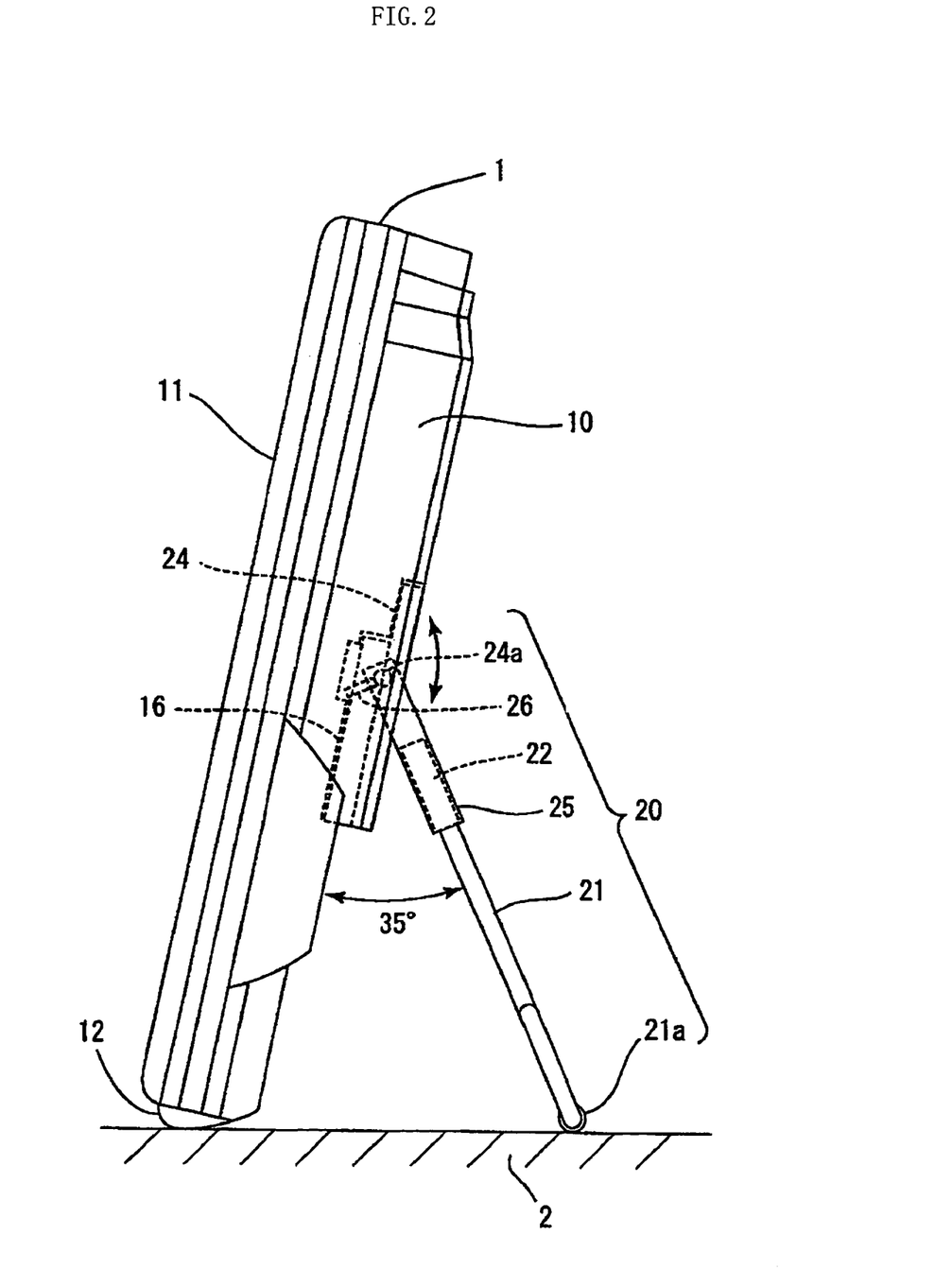
FIG. 2 is a side view of the liquid crystal television of the present invention.

FIG. 2 is a side view of the crystal liquid television 1. In FIG. 2, a stand 20 for supporting the main body 10 is provided to a back surface of the main body 10. The stand 20 includes an arm 21 formed by bending a metal rod. A grounding portion 21a at a lower end of the arm 21 is provided with a ring member 21b formed of a rubber having a high friction coefficient. The stand 20 is grounded on the mount rack 2 via the ring member 21b.

An upper portion of the arm 21 is comprised of a pivot member 22 having a substantially box shape. The pivot member 22 is pivotally connected, via a pivot axis 24a at an upper end of the pivot member 22, with a fixing portion 24 which can house the pivot member 22. A concave portion 16 which has the substantially same shape as the fixing portion 24 and houses the fixing portion 24 is provided to the back surface of the main body 10. The fixing portion 24 is screwed to the concave portion 16, so that the whole of the stand 20 is joined with the main body 10. A stopper 26 having a substantially cylindrical shape is provided projecting from near the pivot axis 24a of the pivoting member 22 toward the main body 10. When the main body 10 is angled at 35 degrees to the arm 21, the stopper 26 ratches the fixing portion 24. Therefore, the main body 10 and arm 21 do not split over 35 degrees at which the stopper 26 ratches the fixing portion 24.

The pivoting member 22 contains a moving block 25 such that the moving block 25 can slide in a range of a predetermined length in a direction of a radius about the pivot axis 24a. Additionally, the arm 21 is joined with the slidable moving block 25, and the lower end of the arm 21 is oriented in an outward direction of the pivot axis 24a, so that the arm 21 can slide. The configuration of the pivoting member 22, fixing portion 24, and moving block 25 is explained later in detail.

As described above, when the stopper 26 ratches the fixing portion 24 so that the main body 10 is angled at 35 degrees to the arm 21, the main body 10 tilts at an angle of 12 degrees to a vertical plane. At this tilt angle, the whole of the main body 10 is located forward of the ring member 21b. The gravity of the main body 10 is located lower than a portion connected with the upper end of the stand 20. The rubber member 12 provided to the bottom surface of the main body 10 has a curved bottom surface whose radius gradually increases from front to back.

As described above, the rubber member 12 is wholly grounded in a width direction of the main body 10, and two points, the rubber member 12 and the ring member 21b, are grounded in a thickness direction of the main body 10. Accordingly, the main body 10 can be placed on a horizontal plane because it is supported at a plurality of points in both width and thickness directions. Additionally, the whole of the main body 10 is placed forward of the ring member 21b, so that the gravity of the main body 10 is between the rubber member 12 and ring member 21b which are grounded, thereby preventing the main body 10 from tumbling in the thickness direction. Therefore, the liquid crystal television 1 can be stably placed on the horizontal plane such that the liquid crystal monitor 11 is at the angle of 12 degrees to the vertical plane.

Additionally, because the main body 10 tilts at the angle of 12 degrees, the gravity of the main body 10 is between the rubber member 12 and ring member 21b even when the top surface of the mount rack 2 tilts forward at an angle of 10 degrees, thus preventing the main body 10 from tumbling forward. Further, because the rubber member 12 and ring member 21b are made of a rubber having a high friction coefficient, they are hard to slip, and the shock when the crystal liquid television 1 is placed on the mount rack 2 is reduced.

Figure 3:
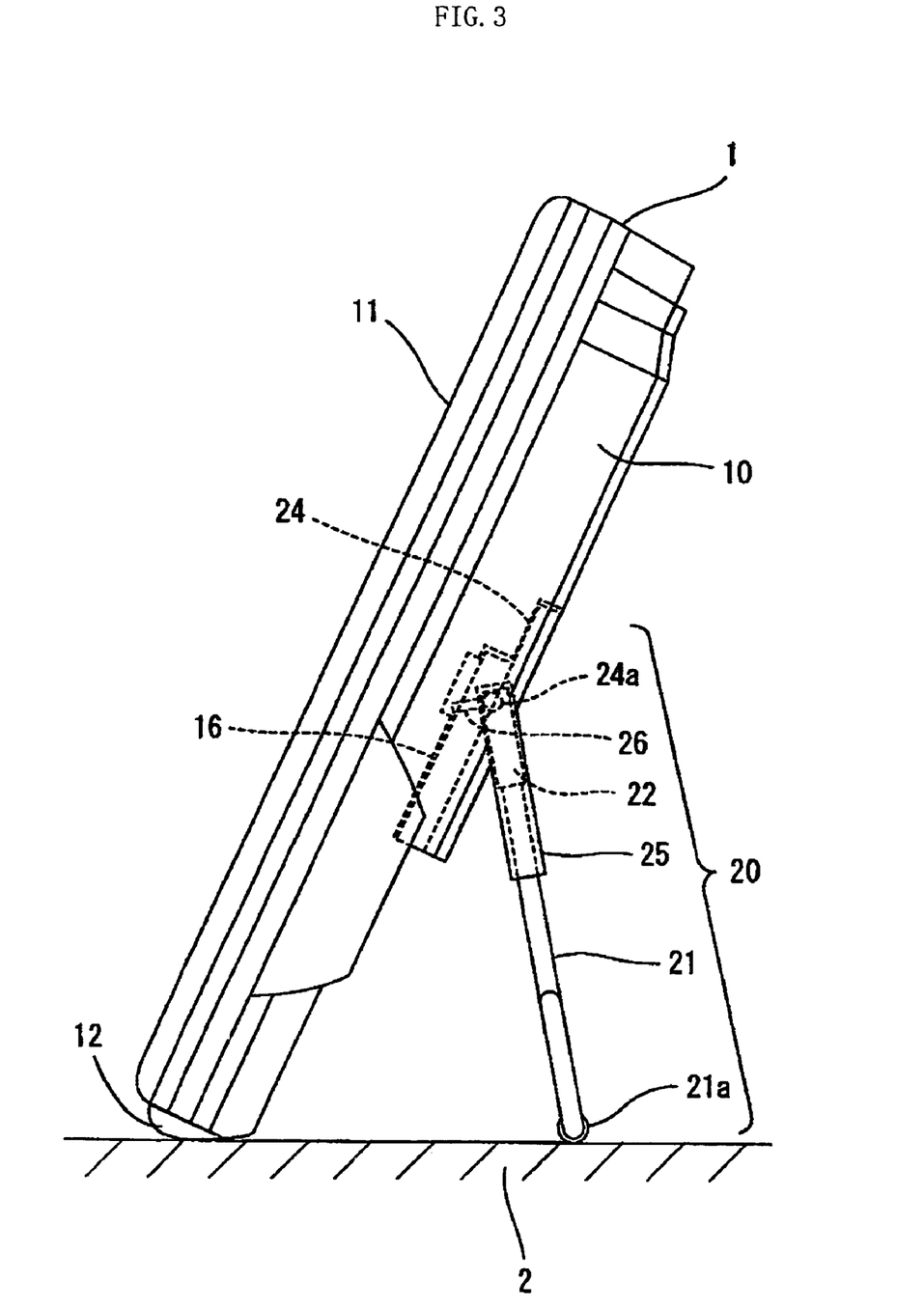
FIG. 3 is a side view of the liquid crystal television of the present invention.

FIG. 3 is a side view of the liquid crystal television 1 of the present embodiment. In FIG. 3, the main body 10 tilts at an angle greater than the tilt angle shown in FIG. 2 so that it is oriented to be angled at 25 degrees to the vertical plane. In FIG. 3 as well as FIG. 1, the stopper 26 ratches the fixing portion 24 so that the arm 21 and main body 10 split downward at the angle of 35 degrees. However, the moving block 25 of the above-described slide mechanism slides toward the pivot axis 24, so that the arm 21 is shortened by 23 mm compared to that shown in FIG. 2. On the other hand, the grounding portion of the lower curved surface of the rubber member 12 provided to the bottom surface of the main body 10 moves backward as the main body 10 tilts.

In such a way, ground positions of the main body 10 and stand 20 relatively change by shortening a length of the arm 21 by 23 mm, so that the main body 10 can tilt at an angle of 25 degree to the vertical plane while a split angle between the main body 10 and stand 20 is 35 degrees. Even in this state, the gravity of the main body 10 is between the rubber member 12 and ring member 21b which are grounded, so that the main body does not tumble in the thickness direction.

As the main body 10 tilts, a forward element of the load on the ground surface of the rubber member 12 becomes great, the downward element becomes small, so that the friction resistance decreases. As a result, the grounding portion tends to slip forward. However, the bottom surface of the rubber member 12 is a curved surface whose radius gradually increases from front to back, so that, in this state, a grounding area of the rubber member 12 increases compared to that in the state shown in FIG. 2. Therefore, the friction resistance increases compared to that in the state shown in FIG. 2, thus preventing the rubber member 12 from slipping forward.

Figure 4:
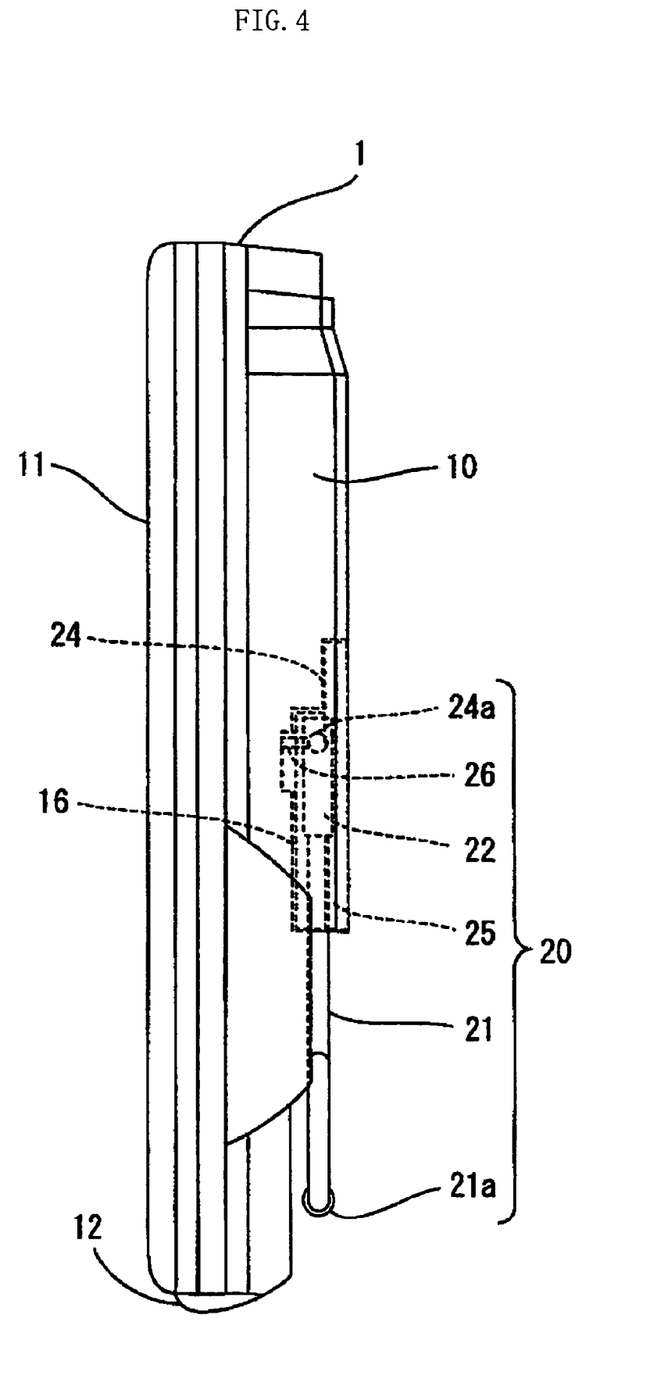
FIG. 4 is a side view of the liquid crystal television of the present invention.

FIG. 4 is a side view of the stand 20, which is closed. In FIG. 4, the stand 20 is closed such that the pivot member 22 rolls to cause the arm 21 to be in substantially parallel with the main body 10. At this time, the pivot member 22 is held in the fixing portion 24, so that the back surface of the main body 10 is substantially flat. On the other hand, the moving block 25 slides in a centripetal direction of the pivot of the pivot member 22 in the same way as the state shown in FIG. 2. Accordingly, the arm 21 is shortened.

As described above, the liquid crystal television 1 becomes extremely compact by closing the stand 20. Therefore, the liquid crystal television 1 does not bulk when transported and contained, so that it is easy to handle. Additionally, the liquid crystal television 1 can be usefully hung on a wall without removing the stand 20 because nothing projects from its back surface. On the other hand, when the liquid crystal television 1, placed on, e.g., a rack, is viewed, a range of the tilt angle of the main body 10, the angle being able to be adjusted by changing a split angle of the stand 20, can be further extended by changing the length of the arm 21. In other words, even when the stand 20 splits at the maximum angle (35 degrees) to the main body 10, the main body 10 is angled at 12 degrees to the vertical plane. Further, when the arm 21 is shortened by 23 mm, the main body 10 can be angled at 25 degrees to the vertical plane.

Because the stopper 26 restricts the stand 20 to split over 25 degree, the stand 20 does not unnecessarily split from the main body 10 to decrease the stability, and the monitor 11 rarely tilts unnecessarily to be out of a range of its view angle when viewed from its front and thus to be difficult to view.

(2) Structure of Stand

Figure 5:
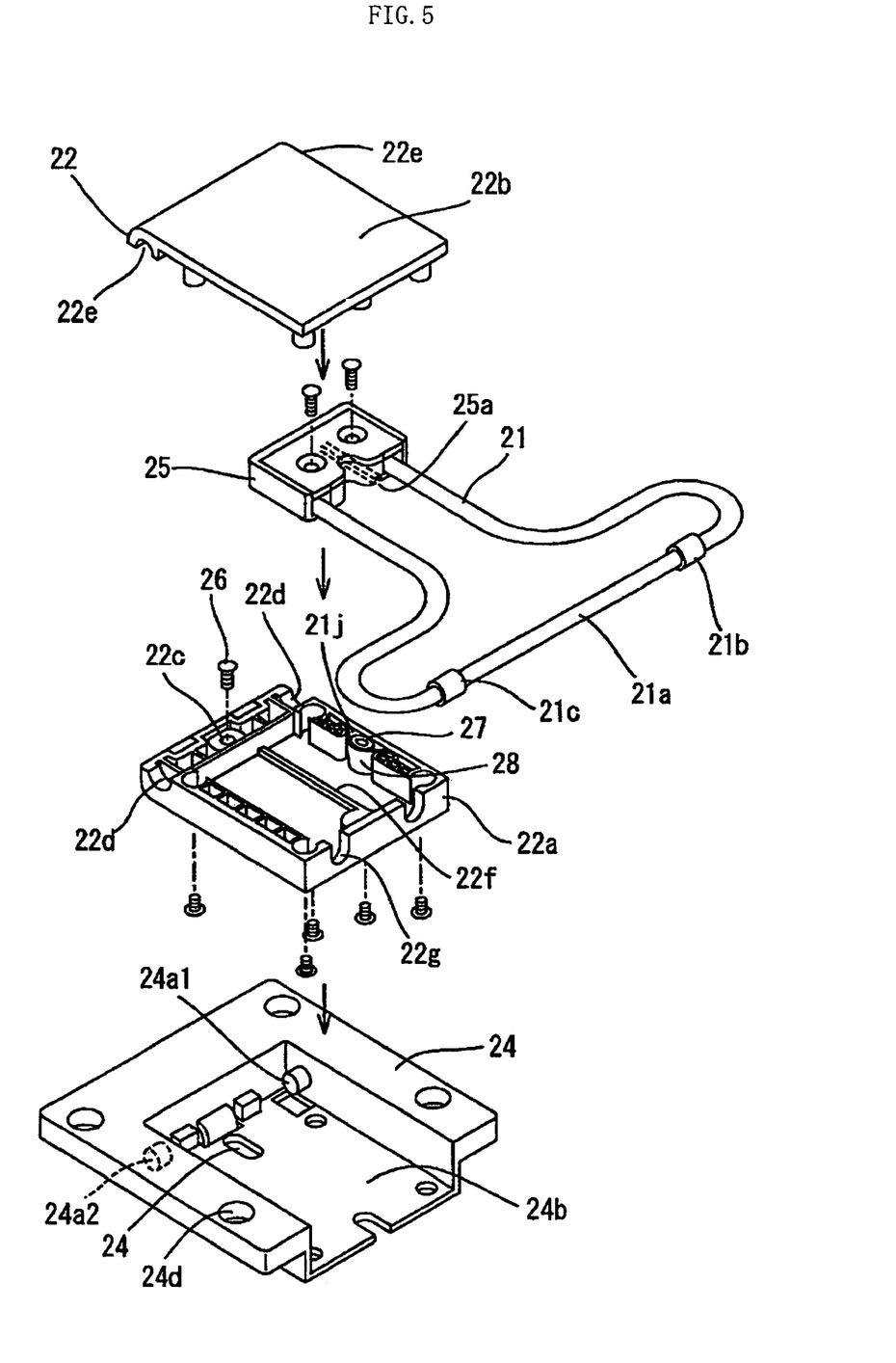
FIG. 5 is an exploded perspective view of the liquid crystal television of the present invention.

FIG. 5 is an exploded view of the stand 20 of the present embodiment. In FIG. 5, the arm 21 is formed by curving a metal rod such that the grounding portion 21*a* becomes wide. A pair of left and right ring members 21*b*, 21*c* are mounted to the grounding portion of the arm 21, which penetrates through their inner diameters. On the other hand, the substantially box shaped moving block 25 provided opposite the grounding portion 21*a* of the arm 21 contains end portions of the arm 21 and fixes them. A surface of the moving block 25 is directed to the main body 10 after the moving block 25 is assembled, and provided with a concave groove 25*a*.

On the other hand, the pivot member 22 slidably containing the moving block 25 is formed by screwing a lid 22*b* to a box member 22*a*. The pivot member 22 has such a size that it can be entirely inserted into the concave portion 24*b* provided to the fixing portion 24. Additionally, by assembling the lid 22*b* and box member 22*a*, half-cylindrical bearings 22*d*1, 22*d*2 are formed to the box member 22*a* in side by side relationship and half-cylindrical bearings 22*e*1, 22*e*2 corresponding to the half-cylindrical bearings 22*d*1, 22*d*2 are formed to the lid 22*b* to form substantially cylindrical concave portions rather greater than substantially cylindrical pivot axes 24*a*1, 24*a*2 provided to the fixing portion 24.

A penetration hole 22*c* is formed to a middle position between the left and right bearings 22*d*1, 22*d*2. The stopper 26 having a pin shape longer than a thickness of the box member 22*a* is inserted into the penetration hole 22*c*, so that its top end penetrates from the pivot member 22 toward the fixing portion 24. On the other hand, a stopper hole 24*c* is formed to the concave portion 24*b*. The stopper hole 24*c* is formed to a position corresponding to the top end of the stopper 26 penetrating toward the fixing portion 24, and is a longitudinally elongated hole through which the top end of the stopper 26 can penetrate. Additionally, a screw hole 24*d* for screwing the main body 10 is provided to an outer edge portion of the fixing portion 24. The fixing portion 24 is entirely held in the concave portion 16 when the fixing portion 24 is fixed to the concave portion 16 by use of the screw hole 24*d*.

A rail 22*f* having a ridged convex shape is formed to the box member 22*a*. A wall of the rail 22*f* is in slidable contact with a groove 25 provided to the moving block 25 when the moving block 25 is held in the box member 22*a*. A concave portion 22*g* having a rather wider diameter than a cross section of the arm 21 is formed to a lower wall of the box member 22*a* to prevent the arm 21 from interfering the box member 22*a*. A metal blade spring 28 having a substantially dogleg shape and a rubber tube 27 are provided to the box member 22*a*, and explained later in detail.

With the above-described structure, the following is achieved. While the moving block 25 is held in the box member 22*a* of the pivot member 22, the lid 22*b* is screwed to the box member 22*a* such that the bearings 22*d*1, 22*e*1 sandwiches the pivot axis 24*a*1 and such that the bearings 22*d*2, 22*e*2 sandwiches the pivot axis 24*a*2. As a result, the stand 20 which can pivot and slide can be formed. The stopper hole 24*c* is formed such that a top end of the stopper 26 comes into contact with a bottom wall of the stopper hole 24*c* when the pivot member 22 pivots to be angled at 35 degrees to the fixing portion 24 after the above assembly. When the pivot member 22 is at angles between 0 to 35 degree to the fixing portion 24, the top end of the stopper 26 can pivot without coming into contact with the stopper hole 24*c*.

(3) Slide Movement

Figure 6:
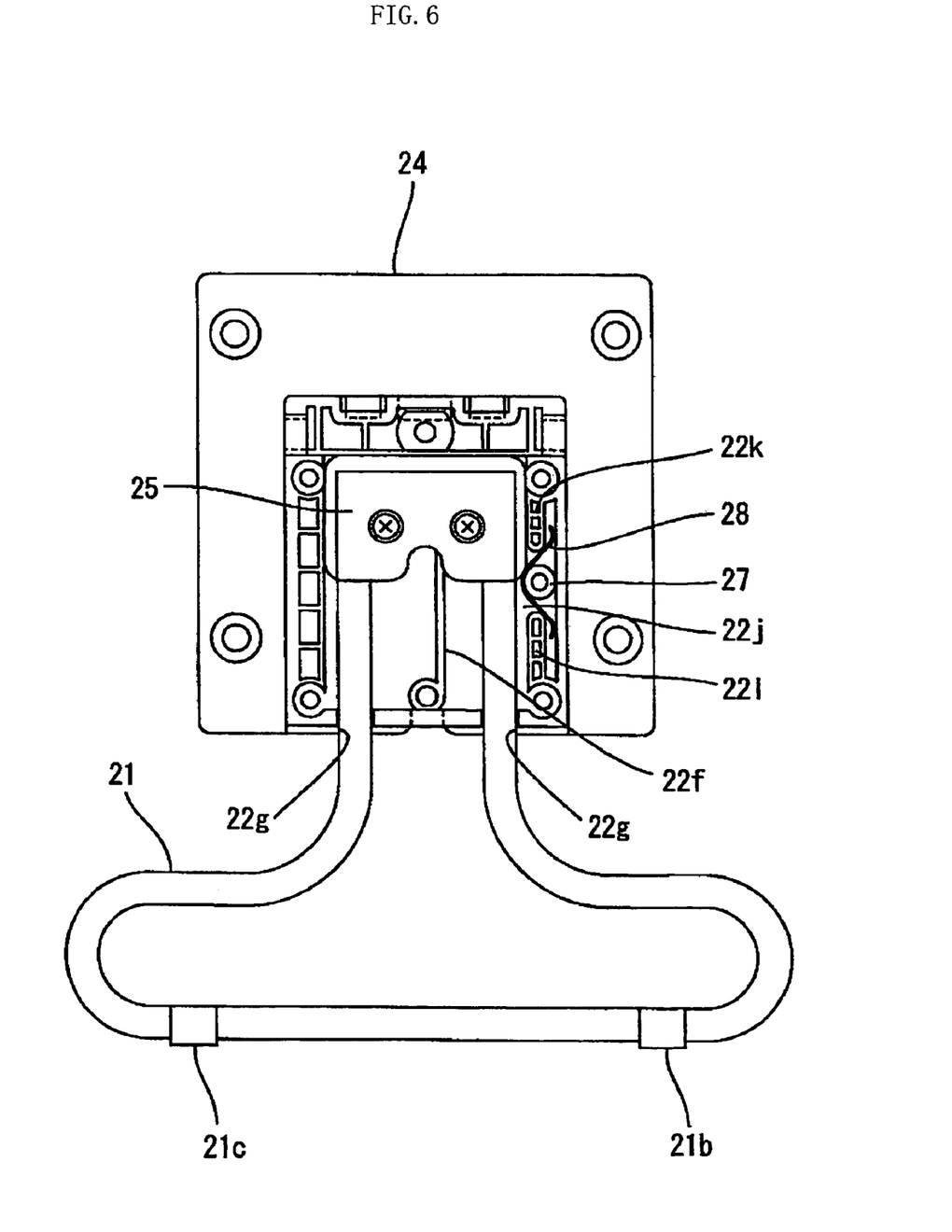
FIG. 6 is a back view of the liquid crystal television of the present invention.

FIG. 6 is a back view of the stand 20 of the present embodiment. For the following explanation, FIG. 6 shows a state of the inside of the pivot member 22 without the lid 22*b* of the pivot member 22. In FIG. 6, the moving block 25 slides to a position at which the upper surface of the moving block 25 comes into contact with an upper inner wall of the pivot member 22. An inner wall of the box member 22*a* comes into contact with a right side surface of the moving block 25, and is comprised of a wall 22*k* extending from upper side to downward and a wall 221 extending from lower side to upward. Top ends of the walls 22*k*, 221 are opposed to each other apart by a predetermined space, thereby forming a notch 22*j*. The walls 22*k*, 221 are formed slightly apart form and in parallel with an inner surface of an outer wall of the box member 22*a*. Ribs are formed in the walls 22*k*, 221 in a thickness direction to secure the strength.

The metal blade spring 28 is provided such that an outside of its resilient bended portion projects toward the moving block 25 and such that its both ends are supported by being sandwiched between the walls 22*k*, 221 and the inner surface of the outer wall of the box member 22*a*. The blade spring 28 is originally shaped such that its bend angle is sharper than that shown in FIG. 6. The rubber tube 27 is inserted into a space between an inner surface of the bended portion of the blade spring 28 and the inner surface of the outer wall of the box member 22*a*. The rubber tube 27 has originally a true cylindrical shape, and provide resilience rebounding outward when compressed as shown in FIG. 6. A friction force generated between the moving block 25 and the pivot member 22 is heavier than the main body 10. The moving block 25 is pressed by a restoring force by which the rubber tube 27 and the blade spring 28 return to their original shapes.

With such a structure, the bended portion of the blade spring 28 can press the right side surface of the moving block 25 by use of the restoring force of the rubber tube 27 and blade spring 28. A friction force generated between the moving block 25 pressed by this restoring force and the pivot member 22 is greater than a weight of the main body 10, so that the constant slide position can be held even when the main body 10 tilts at any angle. Therefore, the moving block 25 does not slide to cause the tilt angle of the main body 10 to change against the intention of a viewer.

In the state shown in FIG. 6, the moving block 25 has slid in contact with the upper inner wall of the pivot member 22. At this time, the bended portion of the blade spring 28 is in contact with just a corner between the lower side surface and right side surface of the moving block 25. The corner is chamfered to have a curved shape. When the bended portion of the blade spring 28 comes into contact with the corner, the bended portion of the blade spring 28 follows the chamfer. At this time, the blade spring 28 and rubber tube try to return to their original shapes such that the shape of the bended portion of the blade spring 28 is deformed to be at a sharper angle. Therefore, the restoring force of the blade spring 28 and rubber tube 21*i* is released by a predetermined amount.

Figure 7:
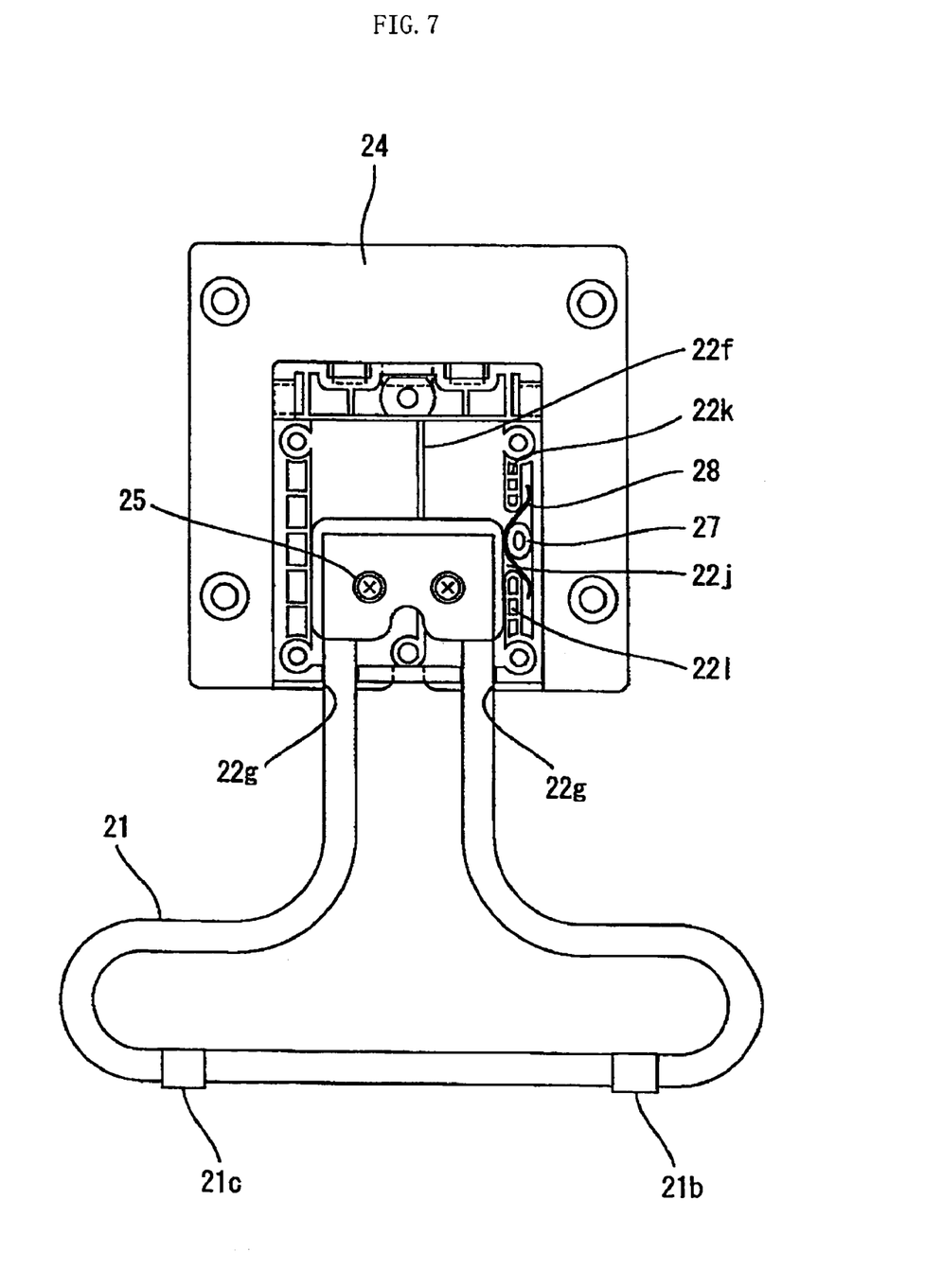
FIG. 7 is a back view of the liquid crystal television of the present invention.

In contrast to the state of the stand 20 explained in reference to FIG. 6, a state of the stand 20 shown in FIG. 7 is such that the bended portion of the blade spring 28 is in contact with a plane portion of the right side surface of the moving block 25, such that the blade spring 28 is deformed such that its bend angle becomes more obtuse, and such that the rubber tube 27 is pressed into a more longitudinally longer shape. When the moving block 25 in the state shown in FIG. 7 slides downward, the lower surface of the moving block 25 finally comes into contact with a lower wall of the box member 22*a*. Just at this time, the bended portion of the blade spring 28 comes into contact with a corner between the upper surface and right side surface of the moving block 25. The corner is chamfered to a curved shape. When the bended portion of the blade spring 28 comes into contact with the corner, it follows the chamfer.

In other words, when the arm 21 is most extended or shortened, the bended portion of the blade spring 28 comes into contact with either of the chamfered corners, so that the restoring force of the blade spring 28 and rubber tube 21*i* is released by a predetermined amount when the bended portion of the blade spring 28 is following the corner. Therefore, an external force equal to or more than the released restoring force is required to cause the arm 21 to be transferred from a state of having most extended or shortened to another state. The bended portion and the chamfered corners come into contact with each other at a gradient to the sliding direction, so that they functions as the resistances when the moving block 25 slides to another position. Therefore, the state that the arm 21 has most extended or shortened can be held stably.

In the present embodiment, the right side surface of the moving block 25 is planar. A plurality of pits are provided to the surface in contact with the bended portion of the blade spring, and the bended portion of the moving block follows the pits when the moving block is sliding, so that the arm can be held stably even when it does not most extended or shortened. In the present embodiment, the arm 21 can extend by 23 mm, which is defined by a stroke of the moving block 25. A length of the moving block 25 in the sliding direction is substantially half of the extendable amount.

On the other hand, when the moving block 25 slides, the pivot member 22's inner walls in parallel with the sliding direction guide the slide of the moving block 25. Additionally, the rail 22*f* provided to the box member 22*a* comes into contact with the groove 25*a* provided to the moving block 25 to guide slide of the moving block 25. Further, a concave portion 22*g* provided to the box member 22*a* comes into contact with and guides the arm 21. Therefore, the moving block 25 and arm 21 are guided by many contact surfaces in parallel with the sliding direction, so that they can slide stably. Furthermore, the rubber tube 27 assists the restoring force of the metal blade spring 28, so that metal fatigue of the blade spring 28 is eased. As a result, the blade spring 28 have high durability.

As described above, the external force equal to or more than the released restoring force is required to cause the arm 21 to be transferred from the state of having most extended or shortened to another state. The arm 21 is formed by bending a rod such that two linear parallel portions are provided from the upper ends held by the moving block 25 to the middle in the height direction, such that half circle portions arcing outward in the width direction from lower ends of the parallel portions are provided from the middle to the lower portion, and such that a linear portion is provided in the width direction to connect between ends of the half circle portions. In other words, the grounding portion 21*a* is formed wide, so that viewers easily apply an external force for sliding the moving block 25 by grasping the grounding portion 21*a* by use of their hands. The liquid crystal television 1 has high stability in the width direction because it is grounded widely.

What is claimed is:

1. A liquid crystal television comprising:
   a main body having a substantially thin box shape; and
   a stand placed to a back surface of the main body,
   wherein
   the stand splits from the back surface of the main body, and supports the main body standing and tilting backward at a predetermined angle,
   the stand including:
   a substantially box shaped pivot member pivotally connected by a predetermined pivot axis between a retracted state in which the stand is substantially in parallel with the main body and a split state in which the stand is at the predetermined angle to the main body;
   a moving block held in the pivot member and movable in a direction of a radius about the predetermined pivot axis;
   a stopper for ratching the main body when the stand is at the predetermined angle to the main body to thereby prevent the stand from splitting over the predetermined angle;
   concave and convex engagement structures formed in parallel with a moving direction of the moving block to slidably engage each other, the structure being respectively formed to the moving block and the pivot member; and
   a supporting arm whose top ends are fixed to the moving block, which projects outward from the pivot member, and which has a grounding portion formed at its lower end by bending a rod into a handle shape to reach an outer ground plane,
   wherein
   a guide block in parallel with a moving direction of the moving block and in slidable contact with the moving block is formed in the pivot member;
   wherein
   a gap is formed to a substantial center of the guide block;
   wherein
   a bended portion of a substantially doglegged blade spring projects via the gap toward the moving block;
   wherein
   both ends of the blade spring come into contact with an inner circumferential wall in the pivot member to generate resilience so that the bended portion projects toward the moving block;
   wherein
   the resilience is enhanced by inserting a resilient member into a small space surrounded by the bended portion of the blade spring and the inner circumferential wall in the pivot member;
   wherein
   the bended portion comes into contact with a lower curvedly-chamfered corner of the moving block when the moving block is at an upper end position to which the moving block can move in the pivot member, and the bended portion comes into contact with an upper curvedly-chamfered corner of the moving block when the moving block is at a lower end position to which the moving block can move in the pivot member, so that the bended portion of the blade spring follows the chamfered portions and deforms to project toward the moving block to thereby release the resilience;
wherein
the main body has a larger grounding area in a tilted state in which the moving block is at the upper end position in the pivot member than in a tilted state in which the moving block is at the lower end position in the pivot member; and
wherein
a rubber foot is installed to a bottom surface of the main body.

2. A liquid crystal television comprising:
a main body having a substantially thin box shape; and
a stand placed to a back surface of the main body,
wherein
the stand splits from the back surface of the main body to support the main body tilting backward at a predetermined angle,
the stand including:
a substantially box shaped pivot member pivotally connected by a predetermined pivot axis between its retracted state substantially in parallel with the main body and its split state at the predetermined angle to the main body;
a moving block which is held in the pivot member, which is movable within a predetermined length in the radial direction about the pivot axis, and which can be stably held at a plurality of positions; and
a supporting arm whose upper ends are fixed to the moving block and which projects outward from the pivot member to reach an outer grounding portion at its lower end.

3. The crystal liquid television according to claim 2, further comprising a stopper which is formed to the pivot member and which ratches the main body when the stand splits up to a predetermined angle with respect to the main body to thereby prevent the stand from splitting over the predetermined angle.

4. The crystal liquid television according to claim 2, wherein concave and convex engagement structures formed in parallel with a moving direction of the moving block to slidably engage each other are respectively formed to the moving block and the pivot member.

5. The crystal liquid television according to claim 2, wherein a guide block in parallel with the moving direction of the moving block and in slidable contact with the moving block is formed in the pivot member, a gap is formed at a substantial center of the guide block, and a bended portion of a blade spring bended to a dogleg shape projects via the gap toward the moving block, both end portions of the blade spring come into contact with an inner circumferential wall in the pivot member to generate resilience for projecting the bended portion toward the moving block.

6. The crystal liquid television according to claim 5, wherein an resilient member which enhances resilience of the bended portion of the blade spring is inserted into a small space surrounded by the bended portion and an inner circumferential wall in the pivot member.

7. The crystal liquid television according to claim 5, wherein the bended portion comes into contact with a lower corner of the moving block when the moving block is at the upper end position to which the moving block can move, the bended portion comes into contact with an upper corner of the moving block when the moving block is at the lower end position to which the moving block can move, the lower and upper corners are curvedly chamfered, and the blade spring causes its bended portion to follow the chamfered portions and to deform to project toward the moving block to thereby release the resilience.

8. The crystal liquid television according to claim 2, wherein a lower end of the supporting arm is formed by bending a rod to a wide handle shape.

9. The crystal liquid television according to claim 2, wherein a rubber foot is installed to a bottom surface of the main body, and the rubber foot is grounded more largely in a tilted state of the main body when the moving block is at the upper end position in the pivot member than in a tilted state of the main body when the moving block is at the lower end position in the pivot member.

* * * * *